United States Patent [19]

Hums et al.

[11] Patent Number: 5,112,794
[45] Date of Patent: May 12, 1992

[54] ARSENIC-RESISTANT MIXED OXIDE CATALYST AND PROCESS FOR PRODUCING THE SAME

[75] Inventors: Erich Hums; Günther Spitznagel, both of Erlangen, Fed. Rep. of Germany

[73] Assignee: Siemens Aktiengesellschaft, Munich, Fed. Rep. of Germany

[21] Appl. No.: 541,714

[22] Filed: Jun. 21, 1990

[30] Foreign Application Priority Data

Jun. 21, 1989 [DE] Fed. Rep. of Germany ....... 3920311

[51] Int. Cl.⁵ .................. B01J 21/04; B01J 21/06; B01J 23/22; B01J 23/28
[52] U.S. Cl. .................... 502/309; 502/248; 502/312
[58] Field of Search ................ 502/248, 309, 312

[56] References Cited

U.S. PATENT DOCUMENTS 4,071,601 1/1978 Shiraishi et al. ............. 502/312 X
4,925,825 5/1990 Tachi et al. ................. 502/309

FOREIGN PATENT DOCUMENTS 1253685 11/1967 Fed. Rep. of Germany .

OTHER PUBLICATIONS

Magazine 'Surface Technology', 9(1979), pp. 195–202, "Studies on the Heterogeneous Oxidation of 1-Butene Over $V_2O_5$-$MoO_3$ Catalyst" by K. M. ABD El-Salaan and E. A. Hassan.

Primary Examiner—W. J. Shine
Attorney, Agent, or Firm—Herbert L. Lerner; Laurence A. Greenberg

[57] ABSTRACT

In an arsenic resistant mixed oxide catalyst and a process for producing the same, oxides of at least the metals vanadium and molybdenum are provided, especially for reducing nitrogen oxides in flue gases in the presence of a reducing agent such as ammonia and carbon monoxide. A $MoO_3$ phase and at least one oxygen-rich mixed oxide phase such as $V_9Mo_6O_{40}$ is at least partly converted into a mixed oxide phase being poorer in oxygen such as a $V_9Mo_4O_{25}$ phase, for increasing arsenic resistance.

26 Claims, 1 Drawing Sheet

ARSENIC-RESISTANT MIXED OXIDE CATALYST AND PROCESS FOR PRODUCING THE SAME

The invention relates to an arsenic-resistant mixed oxide catalyst containing oxides of at least the metals vanadium and molybdenum, and a process for producing the same.

Such mixed oxide catalysts have gained significance for reducing the nitrogen oxides in flue gases in the presence of a reducing agent, among other uses. For this purpose, the flue gases containing nitrogen oxide are enriched with a reducing agent, such as ammonia or carbon monoxide, and moved past the catalytically active surfaces. In the process the nitrogen oxides are converted, and simultaneously the ammonia is oxidized into nitrogen and water vapor. Catalysts that contain oxides of one or more of the metals titanium, vanadium, molybdenum or tungsten are generally used for such purpose.

When such mixed oxide catalysts are in operation in flue gases containing nitrogen oxide, it has been found that they lose their catalytic activity with time, and that they do so faster as the proportion of arsenic in the flue gases increases. When such catalysts are used in the flow of flue gas upstream of the flue gas scrubber, especially when an ash recirculator is provided, they deactivate relatively quickly because of their process-dictated enrichment with catalyst poisons, such as arsenic ($As_2O_3$).

Various mixtures of catalytically active components for suppressing the decrease in catalytic activity as much as possible, have already been studied. It has been possible to insignificantly improve the deactivation course, but not to suppress it.

It is accordingly an object of the invention to provide an arsenic-resistant mixed oxide catalyst and a process for producing the same, which overcome the hereinafore-mentioned disadvantages of the heretofore-known products and methods of this general type and in which such mixed oxide catalysts can be made resistant to the primary catalyst poison present in the flue gas, that is arsenic oxide.

With the foregoing and other objects in view there is provided, in accordance with the invention, an arsenic resistant mixed oxide catalyst containing oxides of at least the metals vanadium and molybdenum, in particular for reducing the nitrogen oxides in flue gases in the presence of a reducing agent such as ammonia or carbon monoxide, having the phases $MoO_3$ and at least one oxygen-rich mixed oxide phase such as $V_9Mo_6O_{40}$ being at least partly converted into a mixed oxide phase being poorer in oxygen, such as a $V_9Mo_4O_{25}$ phase, in order to increase the arsenic resistance.

The invention is based on the recognition that the phase which is lower in oxygen behaves completely resistantly with respect to $As_2O_3$ and at the same time has a catalytic activity on the order of a reduction catalyst. The proportion of this phase can be adjusted in accordance with the desired $deNO_x$ conversion rate for the catalyst.

In accordance with another feature of the invention, in addition to the oxides of vanadium and molybdenum, there are provided metal oxides being difficult to reduce, such as $TiO_2$, $SiO_2$ and $Al_2O_3$.

In accordance with a further feature of the invention, titanium dioxide serves as a support for the mixed oxide phases.

The metal oxides that are difficult to reduce, such as titanium oxide in the anastase form, reinforce the catalytic activity in the reduction of the nitrogen oxides in the presence of a reducing agent such as ammonia, and can be used as support materials for the other catalytically active components.

In accordance with an added feature of the invention, the proportion of vanadium with respect to the sum of vanadium oxide and molybdenum oxide is greater than 3.8 atom percent, and there is provided less than 85% by weight of additional substances, as compared to the total mass of the mixed oxide catalyst material.

In accordance with an additional feature of the invention, the proportion of vanadium as compared to the sum of vanadium oxide and molybdenum oxide is greater than 5 atom percent.

In accordance with yet another feature of the invention, the proportion of vanadium as compared to the sum of vanadium oxide and molybdenum oxide is greater than 8 atom percent.

With the objects of the invention in view there is also provided a process for producing an arsenic resistant mixed oxide reduction catalyst, which comprises mixing together materials in the form of $V_2O_5$ and $MoO_3$ or their precursors as well as other optional metal oxides in a desired quantitative ratio, optionally grinding, and placing the materials in contact with substances that are effective in the phase conversion.

As a result, these substances provide a partial reduction or conversion of the mixed oxide that is richer in oxygen into a phase that is poorer in oxygen. The catalysts produced in this way are largely insensitive to the arsenic oxide in flue gases.

In accordance with another mode of the invention, there is provided a process which comprises using reducing agents as the substances being effective for the phase conversion. They extract oxide from the mixed oxide phase.

In accordance with a further mode of the invention, there is provided a process which comprises using short-chained unsaturated hydrocarbons as the substances being effective for phase conversion. The short-chained, unsaturated hydrocarbons have the property of reducing the mixed oxide phase that is richer in oxygen and converting it into the mixed oxide phase that is poorer in oxygen.

In accordance with an added mode of the invention, there is provided a process which comprises using short-chained saturated hydrocarbons as the reducing agents or the substances being effective for phase conversion.

In accordance with an additional mode of the invention, there is provided a process which comprises using $As_2O_3$ as the substance being effective for the phase conversion.

In accordance with yet another mode of the invention, there is provided a process which comprises carrying out the contacting step at a temperature of from 200 to 600° C.

In accordance with yet a further mode of the invention, there is provided a process which comprises carrying out the contacting step in a fluidized bed.

In accordance with yet an added mode of the invention, there is provided a process which comprises carrying out the contacting step in the presence of an inert gas.

In accordance with still another mode of the invention, there is provided a process which comprises carrying out the contacting step in the presence of nitrogen.

In accordance with still a further mode of the invention, there is provided a process which comprises subjecting a mixture of the materials from the group consisting of $V_2O_5$, $MoO_3$ and precursors thereof and the materials being effective for phase conversion to a subsequent temperature treatment.

In accordance with still an added mode of the invention, there is provided a process which comprises carrying out the phase conversion of the mixed oxide phase in a final calcination step.

In accordance with a concomitant mode of the invention, there is provided a process which comprises carrying out the phase conversion of the mixed oxide phase upon use of the mixed oxide catalyst in a flue gas flow.

Other features which are considered as characteristic for the invention are set forth in the appended claims.

Although the invention is illustrated and described herein as embodied in an arsenic-resistant mixed oxide catalyst and a process for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
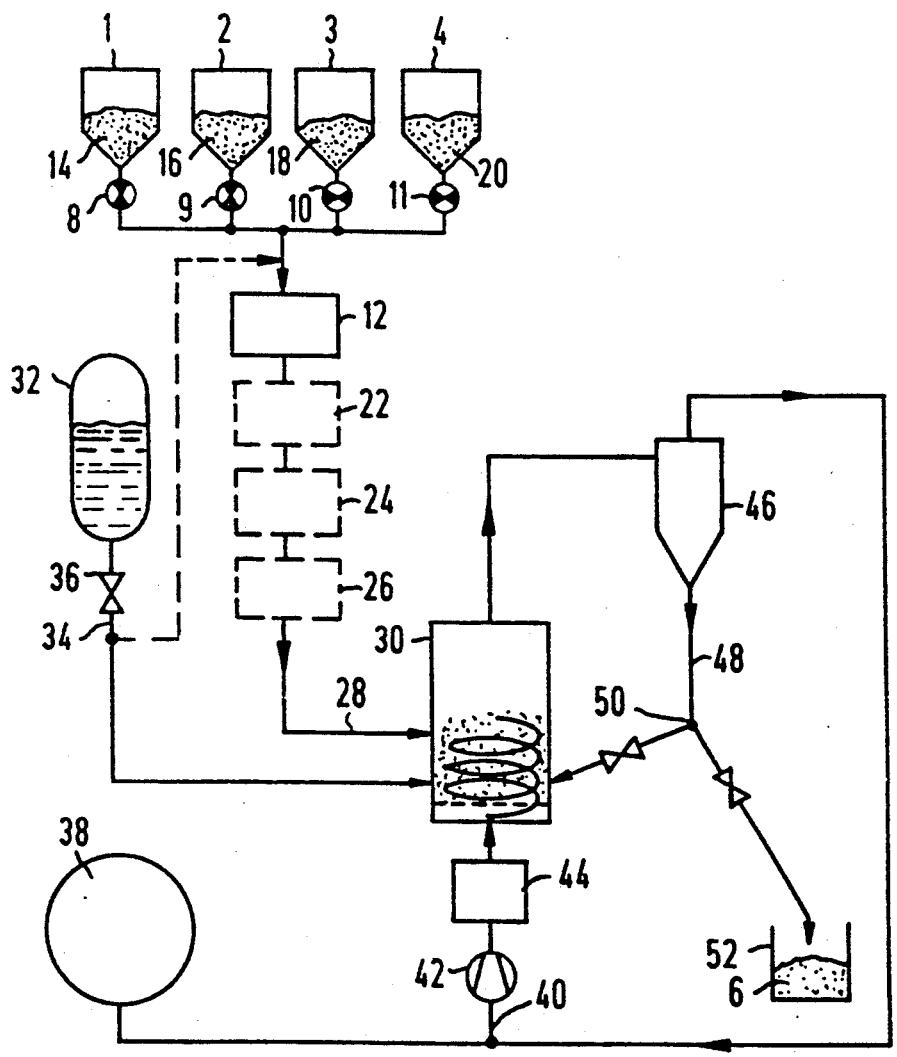
FIG. 1 is a diagrammatic, schematic and block circuit diagram of a production process for the arsenic-resistant mixed oxide catalyst material according to the invention.

DESCRIPTION OF THE PREFERRED EMBODIMENTS:

Referring now to the figures of the drawings in detail and first, particularly, to FIG. 1 thereof, there is seen a plurality of supply containers 1, 2, 3, 4 for starting components of a catalyst material 6 to be produced. Each of the containers is connected to a mixer 12 through a respective metering device 8, 9, 10, 11. The supply container 1 contains vanadium oxide 14, the supply container 2 contains molybdenum oxide 16, in the exemplary embodiment the supply container 3 contains titanium dioxide 18 in the anastase form, and in the exemplary embodiment the supply container 4 contains silicon oxide 20, each of them being in powdered form. In the exemplary embodiment, a first mill 22 is connected to the mixer 12, a calcining furnace 24 is connected to the mill 22, and a second mill 26 is in turn connected downstream of the calcining furnace 24. An outlet line 28 of the second mill 26 discharges into a fluidized bed reactor 30. A reducing agent container 32 is also connected to the fluidized bed reactor 30. A metering pilot valve 36 is built into a reducing agent line 34 of the container 32. On the gas side, the fluidized bed reactor is connected to an inert gas supply container 38. A gas compressor 42 and a heating device 44 are built into an insert gas line 40 leading to the fluidized bed reactor 30. The outlet of the fluidized bed reactor 30 on the gas side is connected through a cyclone separator 46 to the gas compressor 42, and the outlet of the fluidized bed reactor 30 on the dust side is connected through the cyclone separator 46 both to a collection container 52 for the arsenic-resistant mixed oxide catalyst material 6 and back to the fluidized bed reactor 30, as will be explained in greater detail below.

In order to produce the arsenic-resistant mixed oxide catalyst, the vanadium oxide 14, the molybdenum oxide 16, or their precursors, and optionally one or more further metal oxides 18, 20 are supplied to the mixer 12. The ratio of vanadium oxide and molybdenum oxide is adjusted in such a way that at least the oxygen-rich mixed oxide phase and an additional $MoO_3$ phase can form. These various components are mixed together in the mixer 12, then optionally ground together once again in the first mill 22, and then calcined in the furnace 24. The calcined product is ground once again in the second mill 26 connected downstream of the outlet side of the furnace 24. The material from the second mill material is fed into the fluidized bed reactor. At the same time, an adapted quantity of reducing agent, such as short-chained unsaturated or saturated hydrocarbons, is fed directly into the fluidized bed reactor 30 from the reducing agent container 32, through the metering valve 36. In the fluidized bed reactor 30, the solids that have been fed in are fluidized by the inert gas that is forced in through the gas compressor 42 and is heated by the heating device 44. The reducing agent reduces the oxygen-rich mixed oxide phase to the mixed oxide phase that is poorer in oxygen, at a temperature of from 200 to 600° C. and preferably from 450 to 550° C. that is established in this process. The mixture of inert gas and solids removed from the fluidized bed reactor is separated in the cyclone separator 46 connected downstream thereof. In this process the inert gas is returned to the gas compressor 42 in a loop. Some of the separated-out solid material is returned through a line 48 and a branching point 50 to the fluidized bed reactor 30. Some of the precipitated-out solid material, such as finished arsenic-resistant mixed oxide catalyst material, is pumped from the line 48 into a collection container.

The catalytic activity of the arsenic-resistant mixed oxide catalyst can be defined by adjustment of this ratio. This can be done by increasing the original proportion of vanadium oxide at the expense of either molybdenum oxide and/or the further metal oxide such as titanium oxide or other additives. In this way it is possible to develop an arsenic-resistant deNO$_x$ catalyst material having a catalytic activity which is not further impaired by the arsenic oxide entrained in the flue gas flow. If more than 8.5 atom percent of vanadium is used, as referred to the sum of vanadium oxide and molybdenum oxide, and if less than 85% by weight of additives is used, then its total activity is greater than that attained by known deNO$_x$ catalysts after an equivalent period of use in flue gases containing arsenic.

In a departure from the production process shown in FIG. 1, it would also be possible to omit elements 22–26 and the steps carried out thereby, that is the steps of grinding, intermediate calcination, and regrinding. It would also be possible to feed the reducing agent into the mixing stage 12, instead of into the fluidized bed reactor 30.

Figure 2:
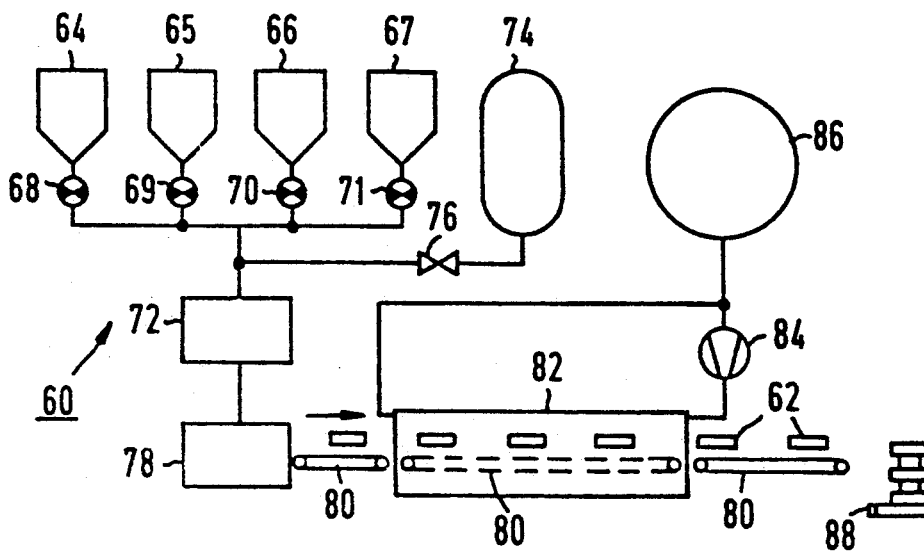
FIG. 2 is a diagrammatic, schematic and block circuit diagram of a production process of a formed arsenic-resistant mixed oxide catalyst according to the invention.

FIG. 2 shows a system 60 for producing a formed or molded arsenic-resistant mixed oxide catalyst 62. Once again, supply containers 64, 65, 66, 67 are provided for starting components of the catalyst 62 to be produced. Each of the supply containers is connected to a kneader 72 through a respective metering device 68, 69, 70, 71. A container 74 for a reducing agent is also connected to the kneader 72 through a metering valve 76. Downstream of the kneader 72 is a forming or molding stage 78 for producing formed or molded catalyst bodies, which are honeycomb bodies in the exemplary embodiment. The forming stage 78 is connected to a conveyor belt system 80 leading to an electrically heated once-through furnace 82. A gas compressor 84 supplies the once-through furnace with an inert gas, which is nitrogen in the exemplary embodiment, that is guided in a circuit from an inert gas container 86.

When the system is in operation, the various metal oxides and the reducing agent are mixed together at a pre-set ratio and because of their doughy state, which is dictated by the reducing agent added, they are kneaded together. The finished kneaded composition, which then contains the reducing agent, is formed into honeycomb bodies and then transported by the conveyor belt system through the once-through furnace. A temperature of preferably from 450 to 550° C. that is needed to calcine the honeycomb body is sufficient to convert the oxygen-rich phase into the phase that is poorer in oxygen. The finished honeycomb bodies, which can be stacked on a pallet, are arsenic-resistant in the same way as the catalyst material produced in the system of the exemplary embodiment of FIG. 1. Once again, the catalytic activity can be adjusted within the equivalent limits, at the expense of molybdenum oxide or titanium oxide.

It has moreover been found that the conversion of the oxygen-richer $V_9Mo_6O_{40}$ phase into the oxygen-poorer $V_9Mo_4O_a$ phase can be effected not only by contact with one of the reducing agents but also by contact with $As_2O_3$.

The system of FIG. 2 can also be modified in such a way that the forming stage 78 is replaced by an apparatus for applying the kneaded composition onto a metal carrier, such as an expanded metal grid. This can be done by rolling it out onto the grid. The coated expanded metal grids, optionally after an intervening deformation step (such as zig-zag folding), can be moved into the once-through furnace 82 instead of the honeycomb bodies. In this way, flat catalysts can also be produced.

In a further embodiment, the conversion of the oxygen-rich phase in the oxygen-poor phase can also be done during the first use of the catalysts in the flue gas, if the flue gas temperature is about 450–500° C.

We claim:

1. Arsenic resistant mixed oxide catalyst for reducing nitrogen oxides in flue gases in the presence of a reducing agent, comprising oxides consisting of at least the metals vanadium and molybdenum, having a $MoO_3$ phase and at least one oxygen-rich mixed oxide phase being at least partly converted into a mixed oxide phase being poorer in oxygen for increasing arsenic resistance, the mixed oxide phase being poorer in oxygen being a $V_9Mo_4O_{25}$ phase.

2. Arsenic-resistant mixed oxide catalyst according to claim 1, wherein the reducing agent is selected from the group consisting of ammonia and carbon monoxide.

3. Arsenic resistant mixed oxide catalyst, comprising oxides consisting of at least the metals vanadium and molybdenum, having a $MoO_3$ phase and at least one oxygen-rich mixed oxide phase being at least partly converted into a mixed oxide phase being poorer in oxygen for increasing arsenic resistance, the mixed oxide phase being poorer in oxygen being a $V_9Mo_4O_{25}$ phase.

4. Arsenic-resistant mixed oxide catalyst according to claim 3, including metal oxides being difficult to reduce.

5. Arsenic-resistant mixed oxide catalyst according to claim 4, wherein the metal oxides being difficult to reduce are selected from the group consisting of $TiO_2$, $SiO_2$ and $Al_2O_3$.

6. Arsenic-resistant mixed oxide catalyst according to claim 3, wherein titanium dioxide serves as a support for the mixed oxide phases.

7. Arsenic-resistant mixed oxide catalyst according to claim 4, wherein titanium dioxide serves as a support for the mixed oxide phases.

8. Arsenic-resistant mixed oxide catalyst according to claim 3, wherein the proportion of vanadium with respect to the sum of vanadium oxide and molybdenum oxide is greater than 3.8 atom percent, and including less than 85% by weight of additional substances, as compared to the total mass of the mixed oxide catalyst material.

9. Arsenic-resistant mixed oxide catalyst according to claim 3, wherein the proportion of vanadium as compared to the sum of vanadium oxide and molybdenum oxide is greater than 5 atom percent.

10. Arsenic-resistant mixed oxide catalyst according to claim 3, wherein the proportion of vanadium as compared to the sum of vanadium oxide and molybdenum oxide is greater than 8 atom percent.

11. Process for producing an arsenic-resistant mixed oxide catalyst, including a $MoO_1$ phase, which comprises mixing together materials consisting of $V_2O_5$ and $MoO_3$ or precursors thereof in a desired quantitative ratio, and placing the materials in contact with substances being effective for at least partly converting the resulting oxygen-rich mixed oxide phase into a mixed oxide phase being poorer in oxygen for increasing arsenic resistance, the mixed oxide phase being poorer in oxygen being a $V_9Mo_4O_{25}$ phase.

12. Process according to claim 11, which comprises mixing other metal oxides selected from the group consisting of $TiO_2$, $SiO_2$ and $Al_2O_3$ with the materials.

13. Process according to claim 11, which comprises grinding the materials.

14. Process according to claim 12, which comprises grinding materials and the other metal oxides.

15. Process according to claim 11, which comprises using reducing agents as the substances being effective for the phase conversion.

16. Process according to claim 11, which comprises using chained, unsaturated hydrocarbons as the substances being effective for the phase conversion.

17. Process according to claim 11, which comprises using short-chained, saturated hydrocarbons as the substances being effective for the phase conversion.

18. Process according to claim 11, which comprises using $As_2O_3$ as the substance being effective for the phase conversion.

19. Process according to claim 11, which comprises carrying the contacting step at a temperature of from 200 to 600° C.

20. Process according to claim 11, which comprises carrying the contacting step in a fluidized bed.

21. Process according to claim 11, which comprises carrying out the contacting step in the presence of an inert gas.

22. Process according to claim 11, which comprises carrying out the contacting step in the presence of nitrogen.

23. Process according to claim 11, which comprises subjecting a mixture of the materials from the group consisting of $V_2O_5$, $MoO_3$ and precursors thereof and the materials being effective for phase conversion to a subsequent temperature treatment.

24. Process according to claim 11, which comprises carrying out the phase conversion of the mixed oxide phase in a final calcination step.

25. Process according to claim 11, which comprises carrying out the phase conversion of the mixed oxide phase upon use of the mixed oxide catalyst in a flue gas flow.

26. Process according to claim 16, wherein the substances effective for at least partly converting the resulting oxygen-rich mixed oxide phase into a mixed oxide phase poorer in oxygen are selected from the group of hydrocarbons and $As_2O_3$, and wherein the method further comprises subsequently exposing the resulting mixture to a temperature of substantially 450 to 550° C. for increasing arsenic resistance.

* * * * *